United States Patent
Hammond (10) Patent No.: US 10,459,758 B2
(45) Date of Patent: Oct. 29, 2019

(54) METHOD TO SET UP AND TEAR DOWN CLOUD ENVIRONMENTS BASED ON A SCHEDULE OBTAINED FROM ONE OR MORE HOSTED CALENDARS

(71) Applicant: Citrix Systems, Inc., Fort Lauderdale, FL (US)

(72) Inventor: Thomas J. Hammond, Coconut Creek, FL (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 7 days.

(21) Appl. No.: 15/654,968

(22) Filed: Jul. 20, 2017

(65) Prior Publication Data
US 2019/0026148 A1    Jan. 24, 2019

(51) Int. Cl.
| | |
|---|---|
| G06F 9/455 | (2018.01) |
| G06F 9/48 | (2006.01) |
| G06F 8/60 | (2018.01) |
| G06F 8/61 | (2018.01) |
| G06Q 10/00 | (2012.01) |
| G06Q 10/06 | (2012.01) |
| G06F 21/31 | (2013.01) |

(52) U.S. Cl.
CPC ............ *G06F 9/4843* (2013.01); *G06F 8/60* (2013.01); *G06F 8/62* (2013.01); *G06Q 10/00* (2013.01); *G06Q 10/06* (2013.01); *G06Q 10/06312* (2013.01); *G06F 8/61* (2013.01); *G06F 21/31* (2013.01)

(58) Field of Classification Search
CPC .......... G06F 9/4881; G06F 2009/4557; G06F 9/5027; G06F 9/505; G06F 9/5083
See application file for complete search history.

(56) References Cited

U.S. PATENT DOCUMENTS

| 9,384,061 | B1* | 7/2016 | Deivanayagam | G06F 9/5083 |
|---|---|---|---|---|
| 2006/0133399 | A1* | 6/2006 | Chang | H04L 41/00 370/420 |
| 2009/0006308 | A1* | 1/2009 | Fonsen | G06F 17/30902 |
| 2009/0077183 | A1 | 3/2009 | Bruce et al. | |

(Continued)

OTHER PUBLICATIONS

International Search Report and Written Opinion for International Appl. No. PCT/US2018/042307, dated Sep. 10, 2018.

*Primary Examiner* — Dong U Kim
(74) *Attorney, Agent, or Firm* — Foley & Lardner LLP; Christopher J. McKenna (57) ABSTRACT

Described embodiments automatically and dynamically deploy and undeploy virtual computing environments by using a schedule obtained from a user's personal, work, or shared team calendars. By using data such as out-of-office or auto-reply statuses, calendar items marked as "Out of Office", and calendar items with specific keywords, the system may dynamically determine when a user is likely to be "present" (or capable of accessing or likely to access a virtual computing environment) or "absent" (or incapable of accessing or unlikely to access the virtual computing environment). The virtual computing environment may be dynamically deployed or undeployed responsive to and/or in anticipation of a user's presence or absence, providing cost savings and reduced bandwidth, power, and processor consumption, without increasing user frustration or requiring extra tasks.

18 Claims, 3 Drawing Sheets

(56) References Cited

U.S. PATENT DOCUMENTS

| | | | |
|---|---|---|---|
| 2012/0023223 A1* | 1/2012 | Branch | G06F 9/4856 |
| | | | 709/224 |
| 2013/0073670 A1* | 3/2013 | Das | G06F 9/5027 |
| | | | 709/217 |
| 2015/0189024 A1* | 7/2015 | Misra | H04L 67/141 |
| | | | 709/205 |
| 2015/0235156 A1* | 8/2015 | Dasari | G06Q 10/06314 |
| | | | 705/7.24 |
| 2015/0324182 A1 | 11/2015 | Barros et al. | |
| 2015/0358810 A1* | 12/2015 | Chao | H04W 52/0209 |
| | | | 455/418 |
| 2016/0189109 A1* | 6/2016 | Le | G06Q 10/1095 |
| | | | 705/7.19 |
| 2016/0321115 A1* | 11/2016 | Thorpe | H04L 47/823 |
| 2016/0328683 A1 | 11/2016 | Palavalli et al. | |
| 2017/0286173 A1* | 10/2017 | Wagh | G06Q 10/1095 |
| 2018/0060825 A1* | 3/2018 | Dubrul | G06Q 10/1093 |

* cited by examiner

METHOD TO SET UP AND TEAR DOWN CLOUD ENVIRONMENTS BASED ON A SCHEDULE OBTAINED FROM ONE OR MORE HOSTED CALENDARS

FIELD OF THE DISCLOSURE

The present application generally relates to management and deployment of virtual computing environments.

BACKGROUND OF THE DISCLOSURE

Virtual computing environments, sometimes referred to as hosted environments, hosted desktops or servers, cloud computing environments, virtual processing environments, virtual storage environments, deployable resources, or by similar terms, allow remote execution and processing of computationally intensive tasks. These environments may be dynamically deployed (e.g. instantiating virtual machines or servers, beginning execution of the hosted environment, etc.) or undeployed (e.g. stopping or terminating execution of the hosted environment, etc.).

During deployment or execution, such environments may require significant power, bandwidth, memory, and processor resources. As a result, the cost of running cloud environments for users and developers 24 hours a day, 7 days a week may frequently be cost-prohibitive, particularly in large operations with many users. While users frequently do not need constant availability of cloud environments (e.g. weekends, holidays, vacations, nighttime, or any other such time when the environment is not in use), deploying and undeploying the environment may take significant time, and users do not want to wait for the environment to be instantiated each time they need access. Users also must remember to un deploy or tear down their cloud environments when not in use. As a result, most users simply leave the virtual environment executing all the time, wasting power, bandwidth, memory, and processor resources, as well as increasing costs for the organization.

BRIEF SUMMARY OF THE DISCLOSURE

The systems and methods discussed herein provide for automatic and dynamic deployment and undeployment by using a schedule obtained from the user's personal, work, or shared team calendars. The calendars can be provided by any service provider such as the WebCal service provided by Google; the Office 365, Outlook.com, or Exchange calendar service provided by Microsoft; the iCal service provided by Apple; or any other remote or local service provider, including enterprise or corporate-maintained calendar services. By using data such as out-of-office or auto-reply statuses, calendar items marked as "Out of Office", and calendar items with specific keywords, the system may dynamically determine when a user is likely to be "present" (or capable of accessing or likely to access a virtual computing environment) or "absent" (or incapable of accessing or unlikely to access the virtual computing environment). The virtual computing environment may be dynamically deployed or undeployed responsive to and/or in anticipation of a user's presence or absence, providing cost savings and reduced bandwidth, power, and processor consumption, without increasing user frustration or requiring extra tasks.

BRIEF DESCRIPTION OF THE FIGURES

The foregoing and other objects, aspects, features, and advantages of the present solution will become more apparent and better understood by referring to the following description taken in conjunction with the accompanying drawings, in which.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

Virtual computing environments, sometimes referred to as hosted environments, hosted desktops or servers, cloud computing environments, or by similar terms, allow remote execution and processing of computationally intensive tasks. These environments may be dynamically deployed, sometimes referred to as set up, instantiation, execution, or establishment of virtual machines or services or by similar terms, or undeployed, sometimes referred to as tear down, stopping or terminating execution, disestablishment, or by other similar terms. Such environments may require significant power, bandwidth, memory, and processor resources, which may be expensive, particularly as the size of the deployment grows. The cost of running cloud environments for users and developers 24 hours a day, 7 days a week may frequently be cost-prohibitive, particularly in large operations with many users. While users frequently do not need constant availability of cloud environments (e.g. weekends, holidays, vacations, nighttime, or any other such time when the environment is not in use), deploying and undeploying the environment may take significant time, and users do not want to wait for the environment to be instantiated each time they need access. Users also must remember to un deploy or tear down their cloud environments when not in use. As a result, most users simply leave the virtual environment executing all the time, wasting power, bandwidth, memory, and processor resources, as well as increasing costs for the organization.

To address these issues, virtual computing environments may be dynamically deployed and undeployed by using a schedule obtained from the user's personal, work, or shared team calendars. The calendars can be provided by any service provider such as the WebCal service provided by Google; the Office 365, Outlook.com, or Exchange calendar service provided by Microsoft; the iCal service provided by Apple; or any other remote or local service provider, including enterprise or corporate-maintained calendar services. By using data such as out-of-office or auto-reply statuses, calendar items marked as "Out of Office", and calendar items with specific keywords, the system may dynamically determine when a user is likely to be "present" (or capable of accessing or likely to access a virtual computing environment, which may include being physically present at an office or data center as well as being able to access the computing environment remotely) or "absent" (or incapable of accessing or unlikely to access the virtual computing environment, which may include being physically not present at the office or data center, as well as being unlikely to access the environment remotely). The virtual computing environment may be dynamically deployed or undeployed responsive to a user's presence or absence. In some implementations, the virtual computing environment may be deployed in anticipation of the user's presence, such that the environment is established and ready to operate when the user is present, without any delay. In some implementations, services that are shared by multiple users may be deployed or undeployed based on a shared or group calendar, or by aggregating individual calendars. For example, a virtual environment used by several users of the group may be deployed when any user is present or capable of or likely to access the environment, and undeployed only when no users are present or capable of or likely to access the environment. This may provide significant cost savings and reduced bandwidth, power, and processor consumption, without increasing user frustration or requiring extra steps such as manually deploying or undeploying the virtual machines or servers.

Additionally, because existing calendar services may be utilized, users need not learn or use separate scheduling programs, custom scheduling databases, or new applications to manage the schedule. This may reduce training costs and maintenance by using systems users already know. Furthermore, because calendar services may be accessible remotely (e.g. via third party service providers or network-accessible calendar servers), the deployment/undeployment schedule may be dynamically updated without introducing any new security requirements.

Figure 1:
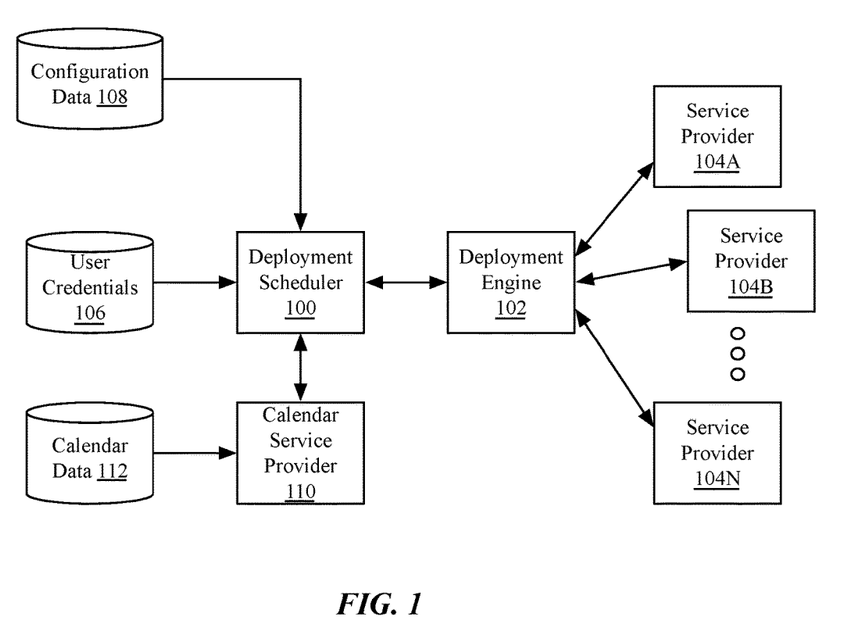
FIG. 1 is a block diagram of an embodiment of a system for calendar-based cloud deployment.

FIG. 1 is a block diagram of an embodiment of a system for calendar-based cloud deployment. The system may include a deployment scheduler 100 in communication with a deployment engine 102. Although shown separate, in many implementations, deployment scheduler 100 and deployment engine 102 may be provided by the same computing device, server, or system. Deployment scheduler 100 and/or deployment engine 102 may comprise computing devices such as one or more servers, workstations, desktop computers, laptop computers, rackmount computers, appliance computing devices, or any other form factor or type of computing devices. In some implementations, deployment scheduler 100 and/or deployment engine 102 may comprise virtual computing devices executed by one or more physical computing devices, such as a server farm, server cloud, cluster, or other computing devices.

Deployment scheduler 100 may communicate with a calendar service provider 110 to retrieve calendar information for users and/or groups, aggregate the information into a aggregated schedule, and direct deployment and undeployment of virtual computing environments. Deployment scheduler 100 may parse calendar information for identifiers and/or keywords that indicate the presence or absence of a user (or corresponding virtual environment access capabilities or likelihoods), such as out of office or vacation notifications, work day schedules, meeting information or other such information. In some implementations, deployment scheduler 100 may include a set of parsing rules preconfigured by a provider or administrator. In other implementations, deployment scheduler 100 may dynamically create rules or train rules via a machine learning system with inputs of the user and/or group calendars, and indicators of access to or manual deployment or undeployment of virtual machines or computing environments. For example, responsive to determining that users access the virtual computing environment during a repeated weekly meeting, the deployment scheduler 100 may create a rule specifying that the repeated weekly meeting is associated with user presence. Conversely, responsive to determining that users do not access the virtual computing environment during a different repeated weekly meeting, the deployment scheduler 100 may create a different rule specifying that the different repeated weekly meeting is associated with user absence. Thus, deployment scheduler 100 may dynamically determine whether users or groups are likely to access a virtual computing environment, and direct a deployment engine 102 to deploy or undeploy the virtual computing environment accordingly.

Deployment engine 102 may communicate with deployment scheduler 100 to receive and process deployment and undeployment requests and/or configuration information. In some implementations, deployment engine 102 may provide usage indications to deployment scheduler 100, e.g. for training purposes. In some implementations, deployment engine 102 may be provided by a virtual environment service provider 104A-104N (referred to generally as service provider(s) 104). For example, deployment engine 102 may comprise a management agent or server in communication with deployment scheduler 100 via a network or application programming interface (API). In other implementations, deployment engine 102 may communicate with a plurality of service providers 104, and may provide load balancing among service providers 104. For example, deployment engine 102 may select to deploy a virtual environment on a first service provider 104A as opposed to a second service provider 104B to manage network resources or bandwidth, processing loads, latency, costs, or other access characteristics. In some implementations, deployment engine 102 may select to deploy environments among providers based on environment type. For example, deployment engine 102 may deploy a virtual processing environment on a first service provider 104A, and a virtual storage environment on a second service provider 104B.

Service providers 104A-104N may comprise any type and form of virtual environment provider, including cloud service providers such as Amazon's S3 environment, Microsoft's Azure environment, Citrix's cloud environment, or similar software as a service (SaaS) or compute environments, as well as proprietary or network-internal virtual compute environments provided by an enterprise or corporation. Thus, in some implementations, one or more service providers 104 may be provided by the same computing device or devices as deployment engine 102 and/or deployment scheduler 100.

Deployment scheduler 100 may utilize user credentials 106 stored in a database or other storage maintained by the same or other computing devices to retrieve calendar data 112 from a calendar service provider 110. In some implementations, deployment scheduler 100 may receive user credentials 106 from a user's computing device (not illustrated), such as a laptop computer, desktop computer, workstation, server, portable computer, smartphone or tablet, or any other type and form of computing device. In other implementations, deployment scheduler may receive user credentials from an administrator. User credentials may include usernames, passwords, calendar names, group names or membership identification, or any other type and form of data needed to retrieve calendar information for a user from a calendar service provider 110. User credentials 106 may be encrypted, hashed, or otherwise obfuscated to prevent inadvertent disclosure.

As discussed above, deployment scheduler 100 may utilize user credentials 106 to access and/or authenticate with a calendar service provider 110. Calendar service provider 110 may be maintained by the enterprise or corporation on an internal network (e.g. an internal iCal or Exchange server) or may be maintained by a third party accessible via an external network (e.g. an iCloud calendar provided by Apple, a Google Calendar provided by Google, etc.). Deployment scheduler 100 may request and/or retrieve calendar data 112 associated with users and groups identified in user credentials 106. Calendar data 112 may comprise a database, flat file, XML file, or any other type and form of file listing one or more events with corresponding start dates and times and end dates and times (potentially including "all day" events). In many implementations, calendar data 112 may include a location for one or more events (e.g. a meeting room, office number, on-site identifier, off-site identifier, address, or any other such information). In many implementations, calendar data 112 may include a description for one or more events (e.g. title, subject, description, or other such data). In some implementations, calendar data 112 may include attached files for one or more events, information about resources associated with one or more events (e.g. video conferencing or speakerphone resources, etc.), or any other type and formation of information.

Deployment scheduler 100 may parse the calendar data 112 and events associated with a user to identify whether the user will be "present" or "absent" at each time. As discussed above, as used herein, a user is "present" when they are capable of, or in some implementations, likely to access a virtual computing environment, regardless of physical presence at a site (e.g. a user may be "present" while working remotely from home). Similarly, a user is "absent" when they are incapable of, or in some implementations, unlikely to access a virtual computing environment, regardless of physical absence at the site (e.g. a user may be "absent" while asleep at home, despite being able to remotely access the virtual computing environment, if they were awake; or a user may be "absent" while at the office in a lunch meeting in which the virtual computing environment will not be accessed). The deployment scheduler 100 may identify periods of presence or absence based on start and end times of events, as well as locations, keywords, or other identifiers associated with each event. For example, a description of an event including the words "presentation" or "demonstration" may indicate that the user may be utilizing the virtual environment during a meeting. Other keywords may be preconfigured by an administrator, or may be trained by identifying periods during which the virtual computing environment is utilized and extracting keywords from events corresponding to said periods. Work periods may also be identified from calendar event start times and end times (e.g. all meeting related events start after 9 AM, potentially indicating that the user is unlikely to be present before 9 AM on any work day). In some implementations, location information of the user may be used to identify presence or absence. Such information may be provided by a computing device of user, such as a smart phone or laptop computer. The location information may be used, for example, to determine commuting periods during which the user may be considered absent. In some implementations, the deployment scheduler 100 may aggregate data from multiple calendars of users of a group to determine whether any member of the group is present or absent at each time, such that shared resources for the group may be dynamically deployed or undeployed.

Once time periods for presence or absence are identified for a user and/or group, the deployment scheduler may determine to respectively deploy or undeploy a virtual computing environment. The deployment scheduler 100 may retrieve configuration data 108 for the virtual computing environment from a database or storage device, and may transmit a request to the deployment engine 102 to deploy or undeploy the corresponding virtual computing environment based on the configuration data 108. Configuration data 108 may include environment names, variables, access control settings, service provider identifications, service types, users, groups, or any other such information needed to deploy or undeploy a virtual computing environment for a user or group. As discussed above, in some implementations, the deployment scheduler 100 may request to deploy a virtual computing environment in advance of a period in which a user will be present, such that the virtual computing environment is available and ready when the user begins accessing the environment. In some implementations, the deployment scheduler 100 may avoid undeploying an environment if an absent period is very short, such that undeploying and re-deploying the environment may not be completed prior to the next present period. For example, if a system takes five minutes to deploy a virtual computing environment, then the deployment scheduler 100 may not request to undeploy the environment during absent periods shorter than five minutes.

Deployment scheduler 100 may periodically reexamine calendar data 112 for updates. In some implementations, deployment scheduler 100 may request or refresh data every hour, every fifteen minutes, or any other time period. In some implementations, after deploying or undeploying a virtual computing environment, a user, administrator, or group may be notified of the respective deployment or undeployment. Such notifications may be transmitted via any suitable means, including email, text, Slack notifications, etc.

For implementations in which deployment scheduler 100, deployment engine 102, calendar service provider 110, and/or service provider 104A-104N are provided by a plurality of computing devices, the components may communicate via one or more networks. The network connections may include any type and/or form of network and may include any of the following: a point-to-point network, a broadcast network, a telecommunications network, a data communication network, a computer network. The topology of the network may be a bus, star, or ring network topology. The network may be of any such network topology as known to those ordinarily skilled in the art capable of supporting the operations described herein. In some embodiments, different types of data may be transmitted via different protocols. In other embodiments, the same types of data may be transmitted via different protocols.

Figure 2:
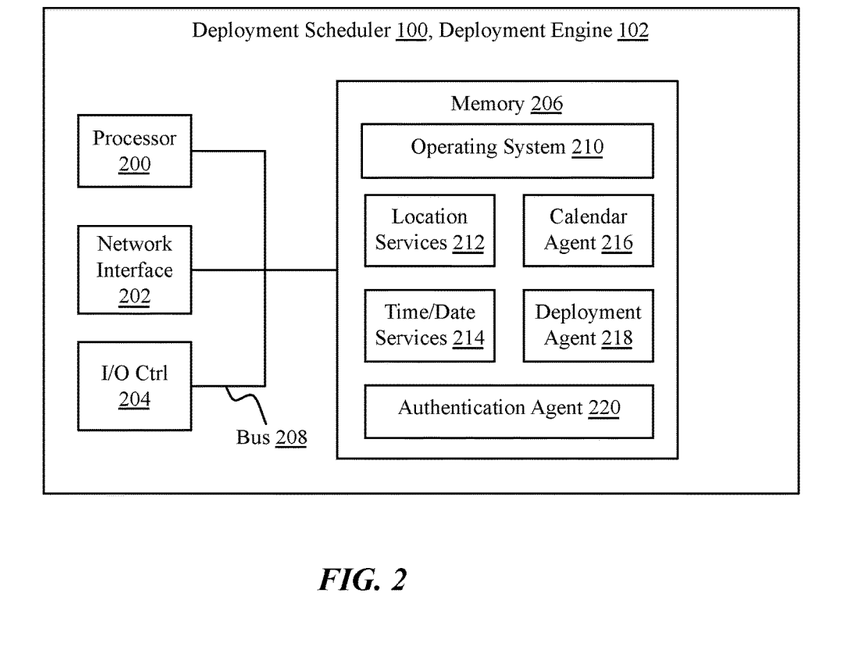
FIG. 2 is a block diagram of an embodiment of a computing device for calendar-based cloud deployment.

Referring to FIG. 2, an embodiment of a computing device is depicted, such as a deployment scheduler 100 and/or deployment engine 102, as well as other computing devices including client computing devices, server computing devices, workstation devices, cloud computing devices, or any other type and form of computing device, referred to generally herein as a "computing device" or "computing devices". Such devices may include laptop computers, desktop computers, rackmount computers, tablet computers, wearable computers, appliances, cluster devices or appliances, server clouds or farms, virtual machines executed by one or more physical machines, or any other type of computing device. As shown in FIG. 2, a computing device may include one or more central processing units or processors 200, one or more network interfaces 202, one or more input/output controllers or devices 204, one or more memory units 206 which may include system memory such as RAM as well as internal or external storage devices. A computing device may also include other units not illustrated including installation devices, display devices, keyboards, pointing devices such as a mouse, touch screen devices, or other such devices. Memory 206 may include, without limitation, an operating system 210 and/or software.

The central processing unit 200 is any logic circuitry that responds to and processes instructions fetched from the memory 206. In many embodiments, the central processing unit 200 is provided by a microprocessor unit, such as: those manufactured by Intel Corporation of Mountain View, Calif.; those manufactured by International Business Machines of White Plains, N.Y.; or those manufactured by Advanced Micro Devices of Sunnyvale, Calif. The computing device 100, 102 may be based on any of these processors, or any other processor capable of operating as described herein.

Memory 206, sometimes referred to as a main memory unit, may be one or more memory chips capable of storing data and allowing any storage location to be directly accessed by the microprocessor 200, such as any type or variant of Static random access memory (SRAM), Dynamic random access memory (DRAM), Ferroelectric RAM (FRAM), NAND Flash, NOR Flash and Solid State Drives (SSD). The memory 206 may be based on any of the above described memory chips, or any other available memory chips capable of operating as described herein. In the embodiment shown, the processor 200 communicates with main memory 206 via a system bus 208 (described in more detail below). In other embodiments, the processor communicates directly with main memory 206 via a memory port. For example, in such embodiments, the memory 206 may be DRDRAM. In other embodiments, processor 200 may communicate directly with cache memory via a secondary bus, sometimes referred to as a backside bus. In other embodiments, the main processor 200 communicates with cache memory using the system bus 208. Cache memory typically has a faster response time than memory accessible via a system bus, and is provided by, for example, SRAM, BSRAM, or EDRAM.

In some embodiments, the processor 200 communicates with various I/O devices 204 via local system bus 208. Various buses may be used to connect the central processing unit 200 to any I/O devices, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display, the processor 200 may use an Advanced Graphics Port (AGP) to communicate with the display. In some embodiments, the processor 200 may communicate directly with I/O devices, for example via HYPERTRANSPORT, RAPIDIO, or INFINIBAND communications technology. A wide variety of I/O devices may be present in the computing device 100, 102. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices may be controlled by an I/O controller 204 as shown in FIG. 2. The I/O controller may control one or more I/O devices such as a keyboard and a pointing device, e.g., a mouse or optical pen. Furthermore, an I/O device may also provide storage and/or an installation medium for the computing device. In still other embodiments, the computing device may provide USB connections (not shown) to receive handheld USB storage devices such as the USB Flash Drive line of devices manufactured by Twintech Industry, Inc. of Los Alamitos, Calif.

The computing device may support any suitable installation device (not illustrated), such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device may further include a storage device, such as one or more hard disk drives or redundant arrays of independent disks, for storing an operating system and other related software, and for storing application software programs such as any program or software for implementing (e.g., configured and/or designed for) the systems and methods described herein. Optionally, any of the installation devices could also be used as the storage device. Additionally, the operating system and the software can be run from a bootable medium.

Furthermore, the computing device may include a network interface 202 to interface to a network through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device communicates with other computing devices via any type and/or form of gateway or tunneling protocol such as Secure Socket Layer (SSL) or Transport Layer Security (TLS). The network interface xx18 may include a built-in network adapter, network interface card, PCMCIA network card, card bus network adapter, wireless network adapter, USB network adapter, modem or any other device suitable for interfacing the computing device to any type of network capable of communication and performing the operations described herein.

In some embodiments, the computing device may include or be connected to one or more display devices. As such, any I/O devices and/or the I/O controller 204 may include any type and/or form of suitable hardware, software, or combination of hardware and software to support, enable or provide for the connection and use of the display device(s) by the computing device. For example, the computing device may include any type and/or form of video adapter, video card, driver, and/or library to interface, communicate, connect or otherwise use the display device(s). In one embodiment, a video adapter may include multiple connectors to interface to the display device(s). In other embodiments, the computing device may include multiple video adapters, with each video adapter connected to the display device(s). In some embodiments, any portion of the operating system 210 of the computing device may be configured for using multiple displays. One ordinarily skilled in the art will recognize and appreciate the various ways and embodiments that a computing device may be configured to have one or more display devices.

In further embodiments, an I/O device may be a bridge between the system bus 208 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a Fibre-Channel bus, a Serial Attached small computer system interface bus, a USB connection, or a HDMI bus.

A computing device 100, 102 of the sort depicted in FIG. 2 may operate under the control of an operating system 210, which control scheduling of tasks and access to system resources. The computing device 100, 102 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7, 8, or 10, produced by Microsoft Corporation of Redmond, Wash.; MAC OS and iOS, produced by Apple Computer of Cupertino, Calif.; WebOS, produced by Research In Motion (RIM); OS/2, produced by International Business Machines of Armonk, N.Y.; and Linux, a freely-available operating system distributed by Caldera Corp. of Salt Lake City, Utah, or any type and/or form of a Unix operating system, among others.

As discussed above, the computer system can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system has sufficient processor power and memory capacity to perform the operations described herein.

In some embodiments, the computing device may have different processors, operating systems, and input devices consistent with the device. For example, in one embodiment, the computing device is a smart phone, mobile device, tablet or personal digital assistant. In still other embodiments, the computing device is an Android-based mobile device, an iPhone smart phone manufactured by Apple Computer of Cupertino, Calif., or a Blackberry or WebOS-based handheld device or smart phone, such as the devices manufactured by Research In Motion Limited. Moreover, the computing device can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

The computing device may execute one or more of location services 212, time/date services 214, calendar agent 216, deployment agent 218, and/or authentication agent 220. For example, a deployment engine 102 may execute an authentication agent 220 and deployment agent 218 to authenticate with third party service providers and request deployment or undeployment of virtual computing environments. In another example, a deployment scheduler 100 may execute an authentication agent 220, calendar agent 216, location services 212, and time/date services 214 to authenticate with and retrieve user and group calendar information from a third party calendar service provider, and determine, based on a location of a computing device of a user and/or a time and date, whether the user is present or absent based on aggregating and parsing calendar event information as discussed above.

Location services 212 may comprise an application, service, server, daemon, agent, routine, or other executable logic for determining a location of a computing device. Location services 212 may comprise or communicate with location-determining hardware, including global positioning service (GPS) receivers, cellular or WiFi antennas, or other such hardware to triangulate or otherwise determine a location of a device. In some implementations, location services 212 may be executed by a computing device of a user (not illustrated) and communicate with a deployment scheduler 100 to indicate a current position of the computing device (and implied position of the user).

Time/date services 214 may comprise an application, service, server, daemon, agent, routine, or other executable logic for determining a present date and time. In many implementations, time/date services 214 may be provided by an operating system 210 of the device. Time/date services 214 may comprise a network time protocol (NTP) server or client, an internal clock, or any other type and form of hardware or software to determine a present time and date. A deployment scheduler may determine, based on the present time and current and/or upcoming calendar events of a user or group, whether to deploy or undeploy a virtual computing environment.

Calendar agent 216 may comprise an application, service, server, daemon, agent, routine, or other executable logic for retrieving and parsing a user or group calendar. In some implementations, calendar agent 216 may communicate with a third party calendar provider and, in some implementations via an authentication engine 220, authenticate as a user, group, or administrator to retrieve calendar events of the user and/or group. As discussed above, calendar agent 216 may parse calendar events to identify start and end times and dates, keywords indicating potential use of the virtual computing environment, locations, resources, or other such information. Calendar agent 216 may comprise a plurality of regular expression parsers, such as XML parsers. In some implementations, calendar agent 216 may comprise machine learning code to generate parsing rules based off calendar event data and indications of manual deployment or undeployment of a virtual computing environment.

Deployment agent 218 may comprise an application, service, server, daemon, agent, routine, or other executable logic for requesting deployment or undeployment of a virtual computing environment. Deployment agent 218 may communicate with a third party service provider via an API provided by the service provider to request deployment or undeployment, and may provide configuration information for the virtual computing environment as discussed above.

Authentication agent 220 may comprise an application, service, server, daemon, agent, routine, or other executable logic for authenticating the deployment scheduler 100 and/or deployment engine 102 with calendar providers and virtual environment service providers. Any type and form of authentication may be used, including user name and password, two factor authentication, handshaking protocols, etc.

Figure 3:
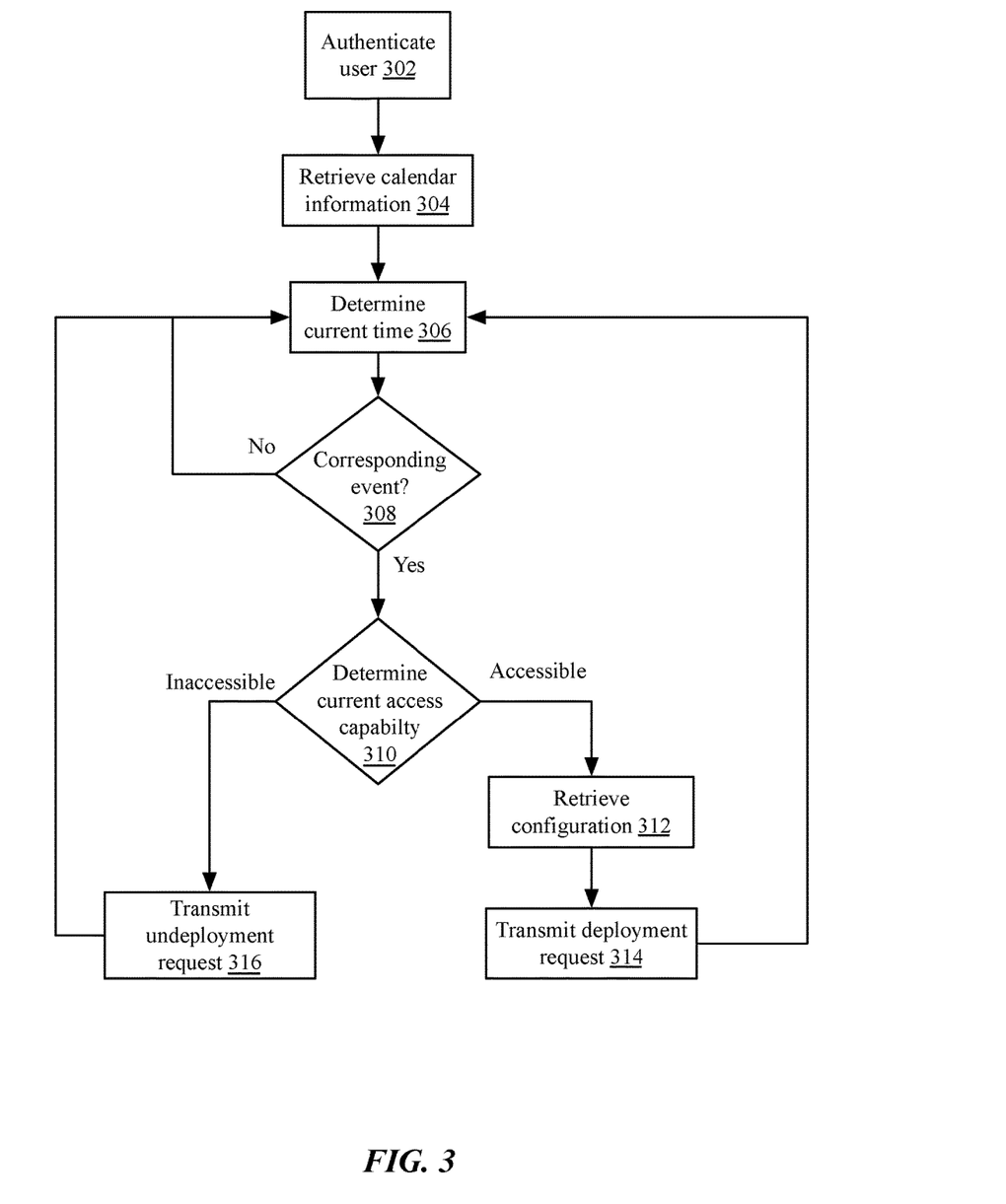
FIG. 3 is a flowchart of a method for calendar-based cloud deployment, according to some embodiments.

FIG. 3 is a flowchart of a method for calendar-based cloud deployment, according to some embodiments. In brief overview, at step 302, a deployment scheduler may authenticate as a user, group member, or administrator with a calendar provider; and at step 304, the deployment scheduler may retrieve calendar information for the user and/or group. At step 306, the deployment scheduler may determine a current date and time and, at step 308, may identify whether there is a corresponding or upcoming event in the retrieved calendar information. If not, steps 306 and 308 (and optionally, steps 302-304) may be repeated periodically. If there is a corresponding event, then at step 310, the deployment scheduler may determine whether the event indicates presence or absence of the user (or whether the user is capable of accessing or likely to access the virtual computing environment, or not capable of accessing or likely to access the virtual computing environment). If the user is capable of accessing or likely to access the environment, then at step 312, in some implementations, the deployment scheduler may retrieve a configuration of the environment, and at step 314, may transmit a deployment request to or via a deployment engine. Conversely, if the user is not capable of accessing or likely to access the environment, then at step 316, the deployment scheduler may transmit an undeployment request to or via a deployment engine. In some implementations, the deployment scheduler may also retrieve the configuration prior to transmitting the undeployment request; accordingly, in some implementations, step 312 may occur prior to step 316. Additionally, in some implementations, the deployment scheduler and/or deployment engine may determine whether the virtual computing environment is presently running, and steps 312-316 may be performed responsive to the state of the environment (e.g. transmitting an undeployment request only if the environment is currently executing, or transmitting a deployment request only if the environment is not currently executing), reducing the number of generated requests when consecutive calendar events both indicate the presence or absence of the user.

Still referring to FIG. 3 and in more detail, at step 302, the deployment scheduler may establish communications with a calendar server, either locally via an internal network or via an external network to a service provider. Establishing communications may comprise authenticating with the calendar server as a user, group, or administrator. Thus, in some implementations, the deployment scheduler may retrieve or receive authentication information for a user of a calendar service including a user name, account name, password, cookie, device identifier, or other authentication information and establish an authenticated session with the server.

At step 304, the deployment scheduler may retrieve calendar information for the user, and/or group, using the received authentication information. In some implementations, the deployment scheduler may retrieve calendar information for a plurality of users, such as a plurality of members of a group or a plurality of users that share a virtual computing environment. In such implementations, the deployment scheduler may aggregate the calendar information from the plurality of users or group members. In other implementations, steps 302-304 may be repeated for a plurality of users. In some implementations, steps 302-304 may be repeated periodically, such as once per day, once per hour, once per five minutes, or any other frequency.

At step 306, the deployment scheduler may determine a current date and time and, at step 308, may determine if the calendar information (or aggregated calendar information) includes a corresponding event. A corresponding event may be one with a start time before or at the present time and end time after or at the present time, or a start time within a predetermined period after the present time (e.g. 10 minutes from now, 15 minutes from now, or any other such time to anticipate use and pre-deploy the environment), or an all-day event corresponding to the present day (or, in some implementations, a subsequent day beginning within the predetermined period after the present time, such as tomorrow with a present time of 11:55 PM). If there is no corresponding event, then steps 306 and 308 may be repeated periodically (e.g. every minute, every five minutes, etc., depending on the temporal resolution desired).

At step 310, if there is a corresponding or upcoming event, the deployment scheduler may parse information of the event to determine a presence or absence of the user or group member (respectively whether the deployable resource is likely to be accessed or should be accessible to the user via a computing device, or whether the deployable resource is not likely to be accessed or is not needed to be accessible to the user). In some implementations, to determine the presence or absence of a user for the event, the deployment scheduler may determine a start time or an end time of an out-of-office period. In some implementations, to determine the presence or absence of a user for the event, the deployment scheduler may extract metadata of the calendar event, such as a predetermined string in the description, subject, or other information of the event indicating presence or absence of the user.

If the deployment scheduler determines that the user will be present for the event or that the deployable resource should be accessible, then at step 312, the deployment scheduler may retrieve configuration information of the deployable resource or virtual processing environment. The configuration information may be user or group specific, or may be generic for a plurality of users or groups. At step 314, the deployment scheduler may transmit a request to deploy the resource, for example by transmitting the configuration information to the deployment engine. In some implementations, the deployment scheduler and/or the deployment engine may select a service provider from a plurality of processing service providers, according to an identification of the service provider in the configuration information, and may transmit the request to the service provider accordingly. In some implementations, steps 312 and 314 may be performed responsive to a determination, by the deployment scheduler, that the deployable resource or virtual computing environment is not yet deployed.

Conversely, if the deployment scheduler determines that the user will not be present for the event or that the deployable resource should not be accessible, then at step 316, the deployment scheduler may transmit a request to the service provider and/or deployment engine to undeploy the resource or virtual computing environment. In some implementations, step 312 may be performed prior to step 316 to retrieve configuration details of the environment (e.g. so that an undeployment request may be transmitted to a proper service provider of a plurality of service providers). In some implementations, step 312 may be performed prior to step 310. In some implementations, step 316 may be performed responsive to a determination, by the deployment scheduler, that the deployable resource or virtual computing environment has been deployed.

In some implementations, the deployment scheduler may parse the calendar events and/or aggregated calendar events to create a deployment schedule. For example, rather than determining a present time and corresponding event, the deployment scheduler may iteratively parse the scheduled events in order to determine, for each event, whether the resource should be deployed or undeployed. Consecutive periods in which the resource should be deployed may be combined or aggregated into a single deployment period; similarly, consecutive periods in which the resource should be undeployed may be combined or aggregated into a single undeployment period. For example, given a calendar with an event from 9 AM to 10 AM indicating that the user may access the virtual computing environment, and a second event from 10 AM to 11 AM indicating that the user may access the virtual computing environment, the deployment scheduler may determine that the environment should be deployed from 9 AM to 11 AM (or, in some implementations, from 8:50 AM to 11 AM to provide for setup time in advance of usage). Once a deployment schedule has been created, then steps 306-316 may be performed on the deployment schedule. The deployment schedule may be periodically updated or refreshed in case of any changes to the underlying calendars.

In some implementations, these systems and methods can be used for power management of virtual machines. For example, virtual machines can be instantiated or executed, or slept or hibernated, responsive respectively to determining a presence or absence of a user via the systems and methods discussed above. Power consumption may be reduced by dynamically starting up or shutting down resources based on user or group calendars, in addition to saving bandwidth and processor time.

Thus, the systems and methods discussed herein provide for automatic and dynamic deployment and undeployment by using a schedule obtained from the user's personal, work, or shared team calendars. The calendars can be provided by any service provider such as the WebCal service provided by Google; the Office 365, Outlook.com, or Exchange calendar service provided by Microsoft; the iCal service provided by Apple; or any other remote or local service provider, including enterprise or corporate-maintained calendar services. By using data such as out-of-office or auto-reply statuses, calendar items marked as "Out of Office", and calendar items with specific keywords, the system may dynamically determine when a user is likely to be "present" (or capable of accessing or likely to access a virtual computing environment) or "absent" (or incapable of accessing or unlikely to access the virtual computing environment). The virtual computing environment may be dynamically deployed or undeployed responsive to and/or in anticipation of a user's presence or absence, providing cost savings and reduced bandwidth, power, and processor consumption, without increasing user frustration or requiring extra tasks.

In one aspect, the present disclosure is directed to a method for calendar-based cloud deployment. The method includes receiving, by a deployment scheduler operated by a device, authentication information for a user of a calendar service. The method also includes retrieving, by the deployment scheduler from the calendar service, calendar information for the user, using the received authentication information. The method also includes identifying, by the deployment scheduler in the retrieved calendar information, a first calendar event indicating a period in which a deployable resource is to be accessible to the user via a computing device. The method also includes determining, by the deployment scheduler, that the first calendar event corresponds with a present time or location of the user; and responsive to the determination, transmitting a request to a deployment engine to take a deployment action for the deployable resource.

In some implementations, the method includes identifying the first calendar event indicating the period in which the deployable resource is to be accessible to the user by extracting, from the retrieved calendar data, an end time of an out-of-office period. In some implementations, the method includes identifying the first calendar event indicating the period in which the deployable resource is to be accessible to the user by extracting, from the retrieved calendar data, metadata of the first calendar event comprising a first predetermined string.

In some implementations, the method includes identifying, by the deployment scheduler, a second calendar event indicating a period in which the deployable resource is to be inaccessible to the user; determining, by the deployment scheduler, that the second calendar event corresponds with a second present time or location of the user; and responsive to the determination, transmitting a request to the deployment engine to take an undeployment action for the deployable resource. In a further implementation, the method includes identifying the second calendar event indicating the period in which the deployable resource is to be inaccessible to the user by extracting, from the retrieved calendar data, a start time of an out-of-office period. In another further implementation, the method includes identifying the second calendar event indicating the period in which the deployable resource is to be inaccessible to the user by extracting, from the retrieved calendar data, metadata of the second calendar event comprising a second predetermined string.

In some implementations, the method includes receiving, by the deployment scheduler, configuration information of a virtual processing environment. In a further implementation, transmitting the request to the deployment engine to take the deployment action further comprises transmitting the configuration information to the deployment engine. In another further implementation, transmitting the request to the deployment engine to take the deployment action further comprises selecting a first processing service provider from a plurality of processing service providers, according to an identification of the first processing service provider in the configuration information. In some implementations, retrieving calendar information for the user is repeated periodically.

In another aspect, the present disclosure is directed to a system for calendar-based cloud deployment. The system includes a deployment scheduler executable by a processor of a device, in communication with a second device providing a calendar service and a deployment engine. The deployment scheduler is configured to receive authentication information for a user of the calendar service; retrieve, from the calendar service, calendar information for the user, using the received authentication information; identify, in the retrieved calendar information, a first calendar event indicating a period in which a deployable resource is to be accessible to the user; determine that the first calendar event corresponds with a present time or location of the user; and responsive to the determination, transmit a request to a deployment engine to take a deployment action for the deployable resource.

In some implementations, the deployment scheduler is further configured to extract, from the retrieved calendar data, an end time of an out-of-office period. In some implementations, the deployment scheduler is further configured to extract, from the retrieved calendar data, metadata of the first calendar event comprising a first predetermined string. In some implementations, the deployment scheduler is further configured to: identify a second calendar event indicating a period in which the deployable resource is to be inaccessible to the user; determine that the second calendar event corresponds with a second present time or location of the user; and responsive to the determination, transmit a request to the deployment engine to take an undeployment action for the deployable resource. In a further implementation, the deployment scheduler is further configured to extract, from the retrieved calendar data, a start time of an out-of-office period. In another further implementation, the deployment scheduler is further configured to extract, from the retrieved calendar data, metadata of the second calendar event comprising a second predetermined string.

In some implementations, the deployment scheduler is further configured to receive configuration information of a virtual processing environment. In a further implementation, the deployment scheduler is further configured to transmit the configuration information to the deployment engine. In another further implementation, the deployment scheduler is further configured to select a first processing service provider from a plurality of processing service providers, according to an identification of the first processing service provider in the configuration information. In some implementations, the deployment scheduler is further configured to periodically retrieve the calendar information.

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices and APs operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method for calendar-based cloud deployment, comprising:
   receiving, by a deployment scheduler operated by a device, authentication information for a user of a calendar service;
   retrieving, by the deployment scheduler from the calendar service, calendar information for the user, using the received authentication information;
   identifying, by the deployment scheduler in the retrieved calendar information, a first calendar event indicating a period in which a deployable resource is to be accessible to the user via a computing device;
   determining, by the deployment scheduler, that the first calendar event corresponds with a present time or location of the user;
   responsive to the determination that the first calendar event corresponds with the present time or location of the user, transmitting a request to a deployment engine to take a deployment action for the deployable resource, the resource deployed responsive to receipt of the request to take the deployment action;
   identifying, by the deployment scheduler, a second calendar event indicating a period in which the deployed resource is to be inaccessible to the user;

determining, by the deployment scheduler, that the second calendar event corresponds with a second present time or location of the user; and responsive to the determination that the second calendar event corresponds with the second present time or location of the user, transmitting a request to the deployment engine to take an undeployment action for the deployed resource.

2. The method of claim 1, wherein identifying the first calendar event indicating the period in which the deployable resource is to be accessible to the user further comprises extracting, from the retrieved calendar data, an end time of an out-of-office period.

3. The method of claim 1, wherein identifying the first calendar event indicating the period in which the deployable resource is to be accessible to the user further comprises extracting, from the retrieved calendar data, metadata of the first calendar event comprising a first predetermined string.

4. The method of claim 1, wherein identifying the second calendar event indicating the period in which the deployed resource is to be inaccessible to the user further comprises extracting, from the retrieved calendar data, a start time of an out-of-office period.

5. The method of claim 1, wherein identifying the second calendar event indicating the period in which the deployed resource is to be inaccessible to the user further comprises extracting, from the retrieved calendar data, metadata of the second calendar event comprising a second predetermined string.

6. The method of claim 1, further comprising receiving, by the deployment scheduler, configuration information of a virtual processing environment.

7. The method of claim 6, wherein transmitting the request to the deployment engine to take the deployment action further comprises transmitting the configuration information to the deployment engine.

8. The method of claim 6, wherein transmitting the request to the deployment engine to take the deployment action further comprises selecting a first processing service provider from a plurality of processing service providers, according to an identification of the first processing service provider in the configuration information.

9. The method of claim 1, wherein retrieving calendar information for the user is repeated periodically.

10. A system for calendar-based cloud deployment, comprising:

a deployment scheduler executable by a processor of a device, in communication with a second device providing a calendar service and a deployment engine;

wherein the deployment scheduler is configured to:

receive authentication information for a user of the calendar service, retrieve, from the calendar service, calendar information for the user, using the received authentication information, identify, in the retrieved calendar information, a first calendar event indicating a period in which a deployable resource is to be accessible to the user, determine that the first calendar event corresponds with a present time or location of the user, responsive to the determination that the first calendar event corresponds with the present time or location of the user, transmit a request to a deployment engine to take a deployment action for the deployable resource, the resource deployed responsive to receipt of the request to take the deployment action, identify a second calendar event indicating a period in which the deployed resource is to be inaccessible to the user;

determine that the second calendar event corresponds with a second present time or location of the user; and responsive to the determination that the second calendar event corresponds with the second present time or location of the user, transmit a request to the deployment engine to take an undeployment action for the deployed resource.

11. The system of claim 10, wherein the deployment scheduler is further configured to extract, from the retrieved calendar data, an end time of an out-of-office period.

12. The system of claim 10, wherein the deployment scheduler is further configured to extract, from the retrieved calendar data, metadata of the first calendar event comprising a first predetermined string.

13. The system of claim 10, wherein the deployment scheduler is further configured to extract, from the retrieved calendar data, a start time of an out-of-office period.

14. The system of claim 10, wherein the deployment scheduler is further configured to extract, from the retrieved calendar data, metadata of the second calendar event comprising a second predetermined string.

15. The system of claim 10, wherein the deployment scheduler is further configured to receive configuration information of a virtual processing environment.

16. The system of claim 15, wherein the deployment scheduler is further configured to transmit the configuration information to the deployment engine.

17. The system of claim 15, wherein the deployment scheduler is further configured to select a first processing service provider from a plurality of processing service providers, according to an identification of the first processing service provider in the configuration information.

18. The system of claim 10, wherein the deployment scheduler is further configured to periodically retrieve the calendar information.

* * * * *